Nov. 25, 1952 C. R. NICHOLS 2,619,520
ELECTRICAL PROSPECTING
Filed March 2, 1949 5 Sheets-Sheet 1
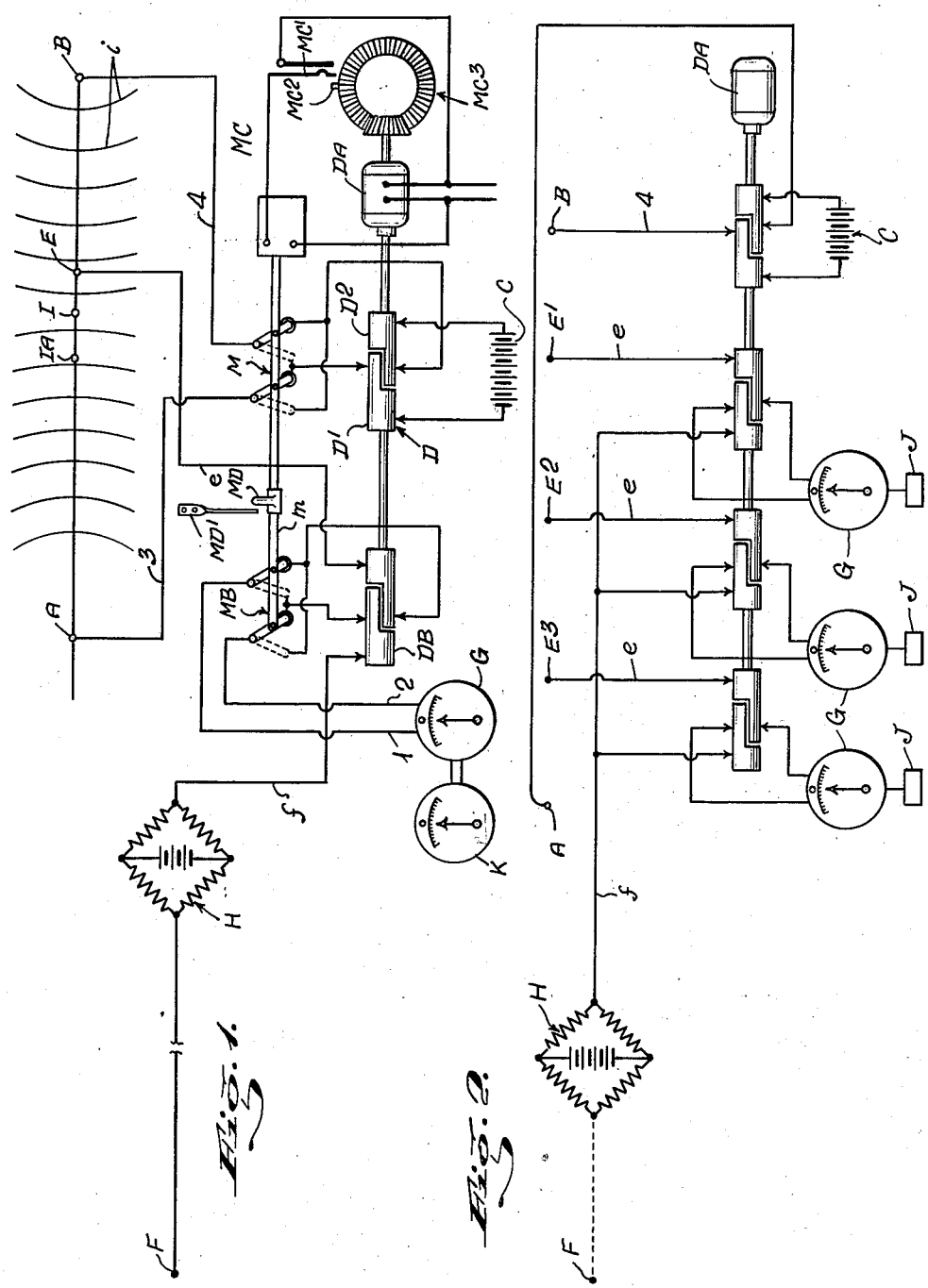
INVENTOR
CHARLES R. NICHOLS
BY
John E. Hubbell
ATTORNEY Nov. 25, 1952  C. R. NICHOLS  2,619,520
ELECTRICAL PROSPECTING
Filed March 2, 1949  5 Sheets-Sheet 2
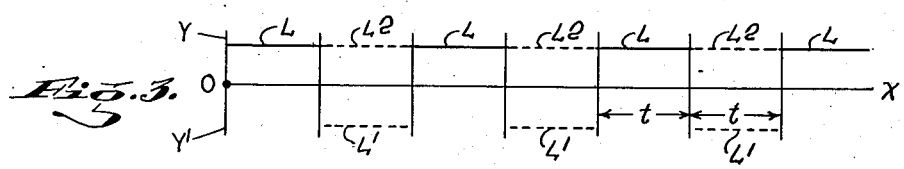
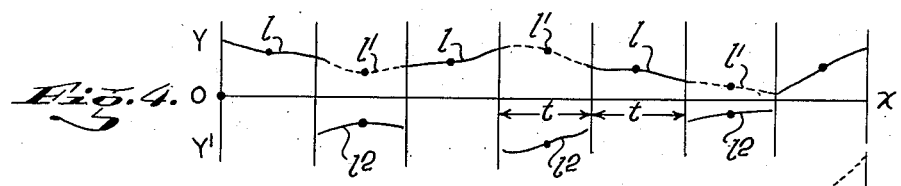
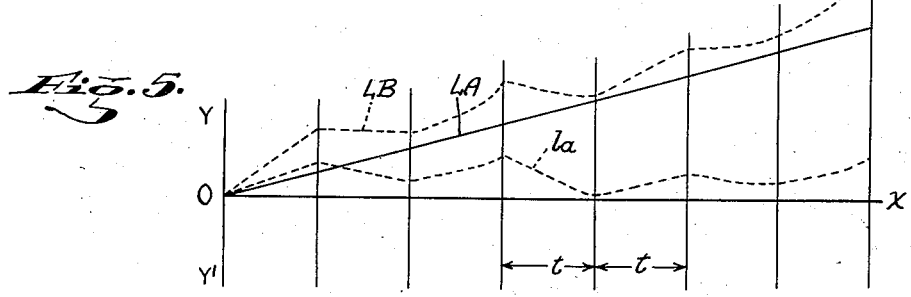
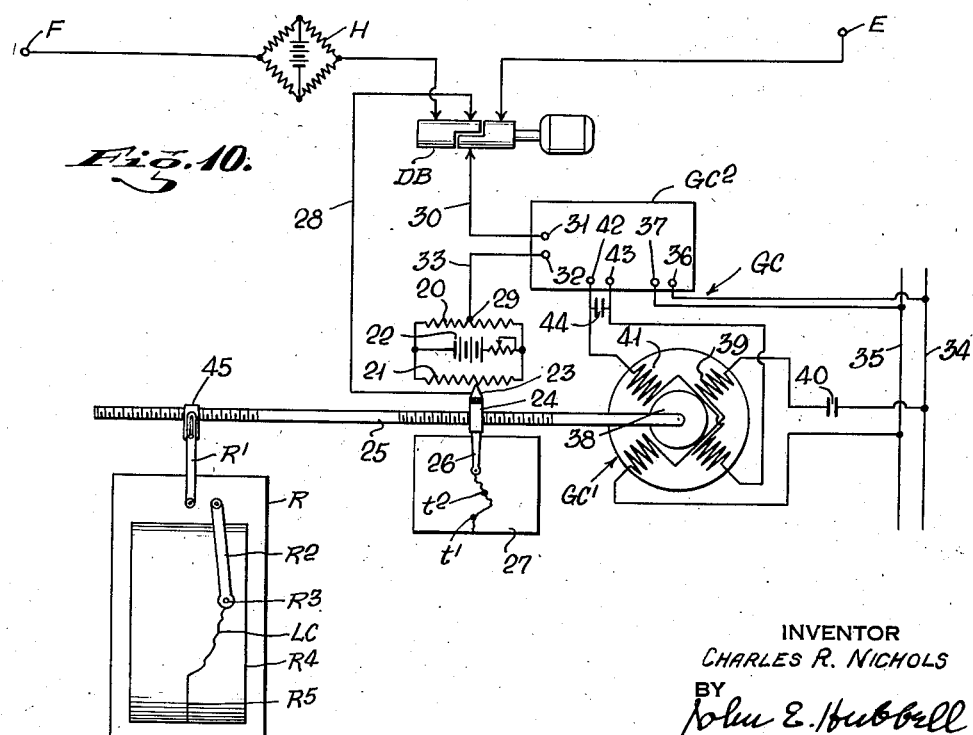
INVENTOR
CHARLES R. NICHOLS
BY
John E. Hubbell
ATTORNEY

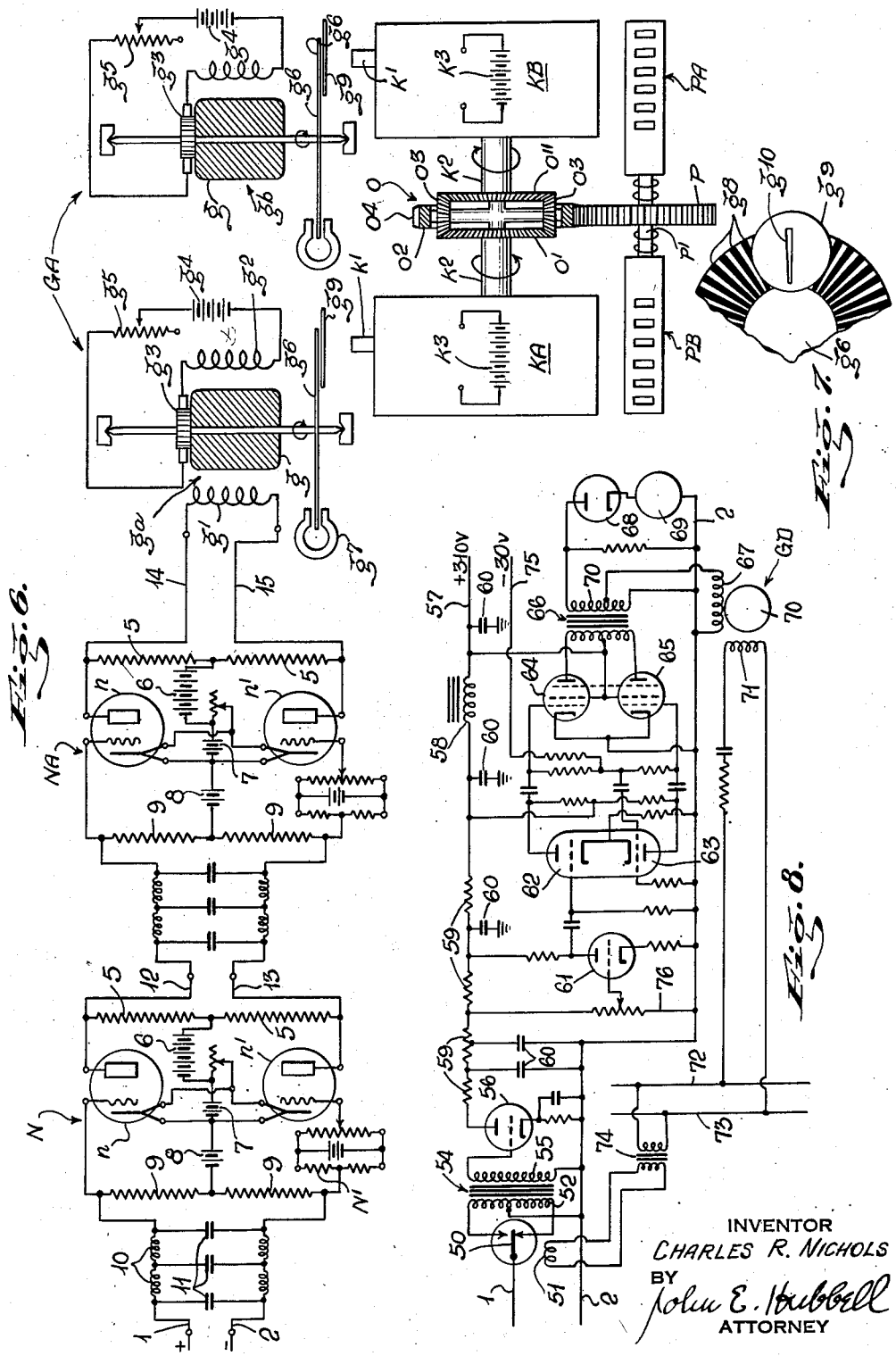

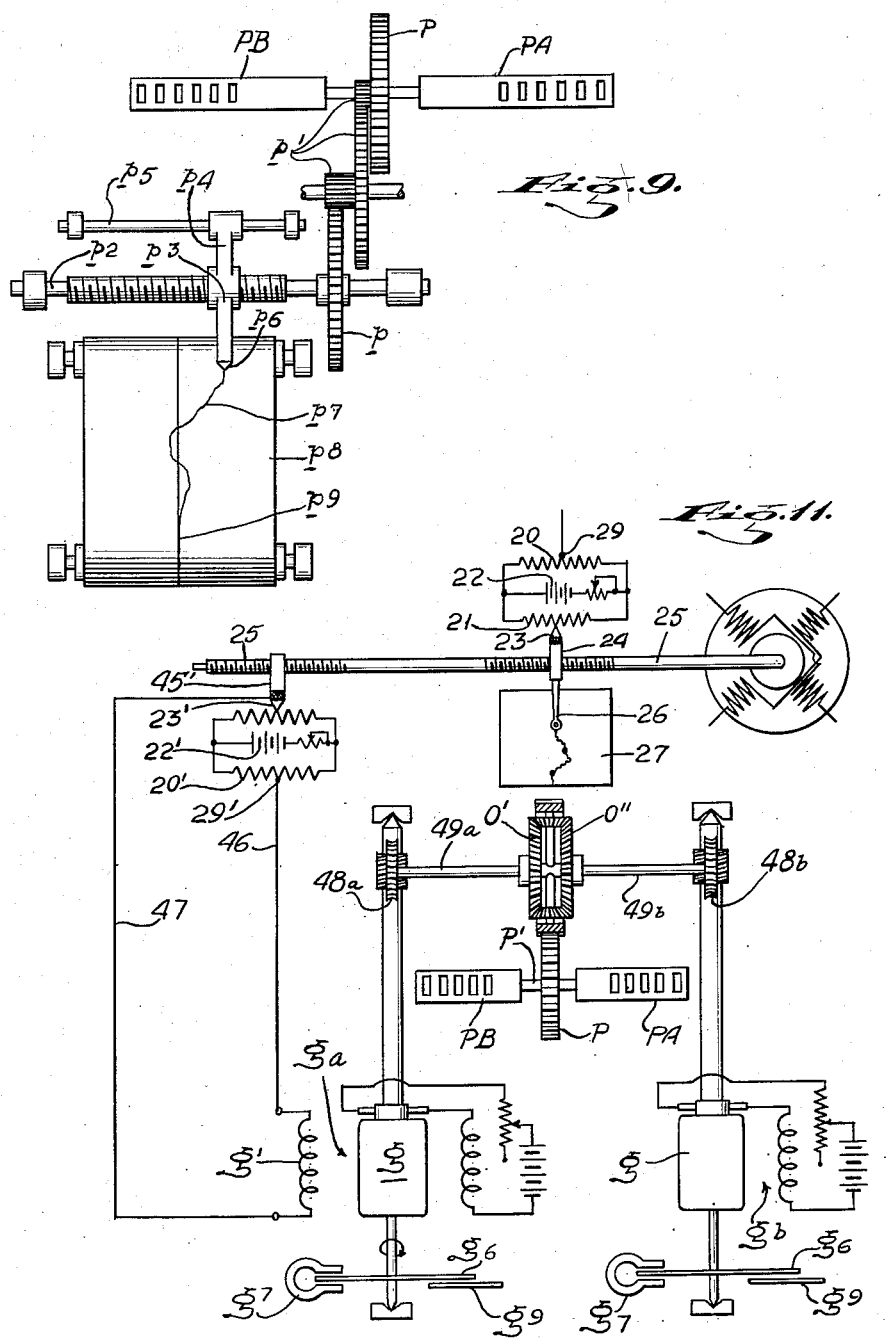

INVENTOR
CHARLES R. NICHOLS
BY John E. Hubbell
ATTORNEY

UNITED STATES PATENT OFFICE 2,619,520

ELECTRICAL PROSPECTING

Charles R. Nichols, McAllen, Tex.

Application March 2, 1949, Serial No. 79,239

15 Claims. (Cl. 175—182)

The present invention comprises improvements in electrical prospecting methods and apparatus for determining earth potentials which are indicative of characteristics of sub-surface portions of the earth, and are adapted for use in determining the location and character of oil and gas deposits and ore bodies, and the general object of the invention is to provide improved methods and apparatus for determining relative potentials of earth points.

A primary object of the present invention is to provide a method of measuring earth point potential differences in such manner as to distinguish between potential difference components which are respectively dependent upon and indicative of the structure and/or composition of the portion of the earth being explored, and components which are of such character as to give little or no significant information concerning sub-surface earth structure and/or composition. The value for exploration purposes of some potential difference components depends upon the character of the exploration method used.

Thus, for example, in a long known type of electrical prospecting method, potential differences between different points are created by connecting a dynamo or other current source in a field energizing circuit including spaced apart earth energization points between which said source is connected, to thereby maintain a current flow through the earth. That current flow creates a potential condition at some earth point displaced from the energization point which is dependent upon the adjacent earth structure and/or composition, and gives an indication of the character of the latter which can be measured by a galvanometer or other measuring device or instrumentality connected into a measuring or observation circuit including the last mentioned earth point. In such case, it is generally advantageous to make the ultimate measurements obtained independent, so far as possible, of the effect of so-called stray earth currents, not created by the potential difference impressed on the energization earth points. Such stray currents may be man-made in the sense that they are due to the operation of electric transmission lines, railroad signals, street car lines, telephone bells, or the like, or they may be due to more or less obscure natural causes, including the action of the earth's magnetic field and electro-chemical actions produced in the earth's structure.

In an alternative type of electrical prospecting method devised by me, I simultaneously determine the relative potentials at a plurality of earth points in a field of exploration in which there is no current flow produced for exploration purposes, and in which the potential differences measured may be wholly due to stray earth currents which may be man-made, or wholly due to the result of natural causes, but usually are due both to human action and to natural causes. In this last mentioned prospecting method, it is, in general, desirable that, insofar as possible, the ultimate or final measurement obtained should be due to stray earth current resulting from natural causes, and should be independent of man-made stray earth currents.

In accordance with the present invention, the ultimate measurements obtained are integrations of potential difference measurements including undesired components, but the latter are largely eliminated or materially reduced in relative importance, in the course of the integration, when the latter is suitably prolonged.

In the preferred mode of using the present invention in exploring an energizing field in the manner described, I reverse the polarity of the earth energization points at suitable intervals and reverse the connection of the measuring device in the observation circuit in synchronism with the polarity reversals in the energizing circuit and integrate the measurements obtained during a suitably prolonged observation period. The double or simultaneous reversals of the direction of current flow in the energizating circuit and in the polarity of the potentials impressed on the measuring device, does not vary the direction or value of that component of the potential difference measured which is due to the potential difference impressed on the energizing points, but the reversal of the connections of the measuring device to the observation circuit reverses the component of the potential measured which is due to stray earth currents.

In consequence, the integrated value of the component due to the field energizing current will, and the integrated value of the component due to stray earth currents will not progressively increase throughout the integration period. By suitably prolonging the integration period, the integrated value of the potential difference component due to the energizing current may thus be made so large relative to the integrated component due to stray earth currents, as to make the latter insignificant. The last mentioned integrated component may be thus made insignificant even though the instantaneous value of the potential difference due to stray earth currents is many times, for example, a hundred times greater than the instantaneous value of the potential difference due to the energizing current, and even though the conditions are such that said integrated component does not tend to approximate zero, as it usually does.

The practical advantages of integrating the measurements obtained in exploring an energized field as above described include a substantial reduction in the magnitude of the energizing current required. Such current may permit of the use of a storage battery as the energizing source in some cases in which such use may be quite desirable, and in cases in which the source of current is a dynamo, the required current outputs, power consumption and weight of the latter may be materially reduced. Such reductions are important of themselves. Furthermore, the energizing current reduction permits of smaller and fewer energizing electrodes at each energization point and permits the use of smaller conductor connections between the current source and energization points which is especially important because of the frequent necessity of moving the apparatus. The reduction in generator voltage also reduces the risk of trouble due to faulty insulation of the conductors connecting the generator to the electrodes at the energization points of the exploration field.

The potential difference measurements simultaneously made in electrically prospecting an unenergized field as above described, ordinarily include components due to man-made earth currents, some of which may be reversed during the observation period, and ordinarily will include some components which continue during a small fraction only of a suitably prolonged integration period. The integrated value of the reversed components will be, or will approximate zero, and by suitably prolonging the integration period the integrated value of components of short duration may be made relatively unimportant in comparison with the integrated value of the potential differences due to natural earth currents which are substantially continuous throughout each integration period of substantial length. It is the last mentioned potential differences which ordinarily give most of the useful information obtainable by electrically prospecting a field which has not been artificially energized for prospecting purposes.

Potential differences may be measured and integrated in accordance with the present invention in various ways. Thus for example, each such difference may be electrically amplified and then measured and integrated by a meter of the watt-hour type. Such a meter may advantageously include or actuate totalizer mechanism, and may include recording mechanism. In some cases the meter used may well be a self balancing potentiometer including a rebalancing mechanism operating substantially continuously to rebalance the potentiometer when the latter is unbalanced. When the potentiometer employed is a simple recording potentiometer, the measurements made may be integrated from the instrument record by the use of a planimeter or integraph. Alternatively, the instrument mechanism required for automatically rebalancing the measuring circuit, when unbalanced by a change in the value of the quantity measured, may be arranged to correspondingly adjust the control leg or element of an integraph, whereby the latter will continuously integrate the measured quantity. I may also make use of other forms of measuring and integrating apparatus operable under the conditions of operation to accurately measure and integrate potential differences varying from a few microvolts up to fifty or one hundred millivolts, or more.

In the exploration of an energized field in the manner above described, the successive energizing periods during which measurements are made ordinarily will be from about two to about six seconds. When the energizing current is reversed between energization periods the intervals between successive measurements preferably are long enough to effect the circuit reversals and to permit the development of a stable current flow through the earth following such reversal.

In the method in which the relative potentials at a plurality of earth points distributed through an exploration field not artificially energized for exploration purposes are measured, it is essential that the different earth point potentials should be measured practically simultaneously. It is also highly desirable, if not practically essential, that the measurements made at each of said points either be continuous or be so rapidly repeated as to be substantially continuous. As will be apparent, however, some forms of apparatus available for use in the practice of my improved method of exploring an energized field are not adapted to make successive measurements as rapidly as is desirable in the practice of the method described for exploring an unenergized field.

Of the drawings:

Fig. 1 is a diagrammatic representation of a form of apparatus used in exploring an energized field;

Fig. 2 is a diagram illustrating a modification of apparatus shown in Fig. 1;

Fig. 3 is a diagram showing measured values of a potential difference component created by the energizing current in the field energized as shown in Fig. 1;

Fig. 4 is a diagram showing measured values of a potential difference component due to stray earth currents in the field shown in Fig. 1;

Fig. 5 is a diagram showing the integrated values of potential differences including components shown in Figs. 3 and 4;

Figure 12:
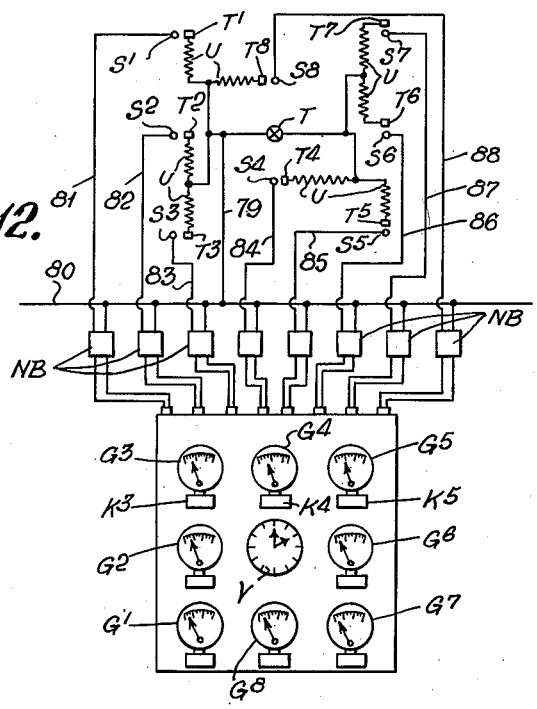
Figure 13:
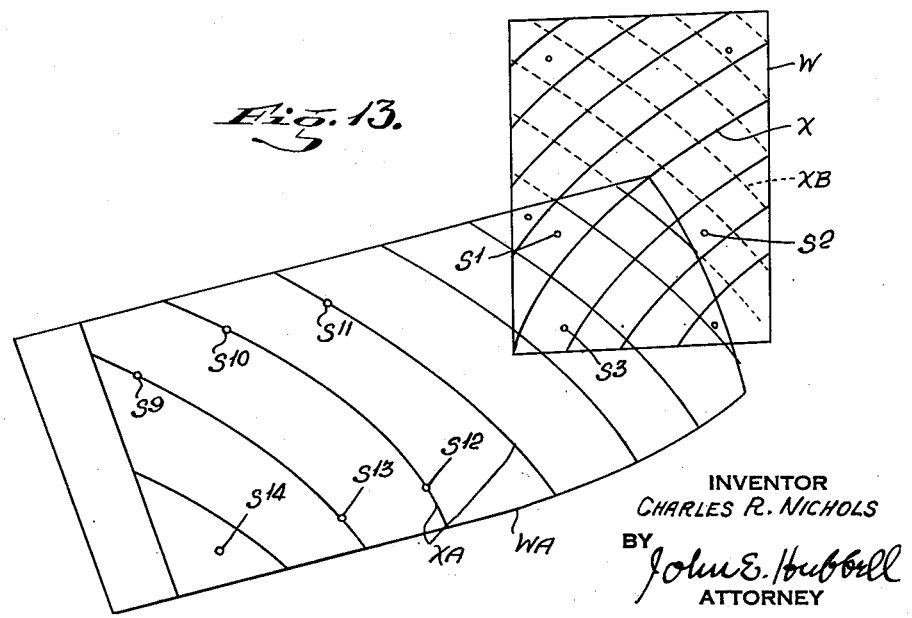

Fig. 6 diagrammatically illustrates one form of electronic measuring and integrating apparatus which may be used in the arrangement shown in Fig. 1;

Fig. 7 is an inverted plan view of a portion of the apparatus shown in Fig. 6;

Fig. 8 diagrammatically illustrates a second form of electronic measuring and integrating apparatus which may be used in the arrangement shown in Fig. 1;

Fig. 9 diagrammatically illustrates an integration recorder associated with apparatus shown in Fig. 6;

Fig. 10 diagrammatically illustrates an operating connection between an integraph and a self-balancing potentiometer arranged to measure earth potential differences;

Fig. 11 illustrates the combination of the measuring apparatus shown in Fig. 10 with integrating apparatus of the type shown in Fig. 6;

Fig. 12 is a diagram illustrating apparatus used in measuring potential differences wholly due to stray earth currents; and Fig. 13 is a diagram illustrating earth potential conditions determined in one use of the apparatus shown in Fig. 12.

In Fig. 1 I have diagrammatically illustrated electrical prospecting apparatus adapted for use in exploring a field energized by means of an energizing circuit comprising a source of direct current C having its terminals connected to spaced apart earth energization points A and B, and including a reversing switch D. As shown, the switch D is in the form of a commutator with two segments D' and $D^2$, and may be rotated by a motor DA. The prospecting apparatus diagrammatically illustrated by way of example in Fig. 1, is adapted for the use of the present invention in the exploration of an energized field by the potential center method of electrical prospecting disclosed in Patent 1,841,376 granted January 19, 1932, on a joint invention of Samuel H. Williston and myself. In accordance with a preferred form of the potential center method disclosed in said patent, use is made in Fig. 1 of an exploring electrode E connected in an observation circuit including a reference or base potential point F and a measuring device G. Usually, and as shown, an adjustable potentiometer H is included in the observation circuit to impress on the latter an E. M. F. approximately equal in magnitude and opposite in direction to the potential difference between the reference potential point F and the earth surface point engaged by the exploring electrode E which is due to stray earth currents.

Insofar as above described, the apparatus shown in Fig. 1 does not differ from a preferred form of apparatus shown in said prior patent, and is adapted for use in locating the midpotential point along the line A—B which exists when the voltage source C is operatively connected between the energization points A and B. As explained in said prior patent, the midpotential point I may be located by adjusting the exploring electrode E along the line A—B until its position is such that the reversal of the direction of current flow in the energizing circuit produces no change in the potential difference between the exploring electrode E and the reference potential point F. If the conductivity of the earth structure underlying the exploring field, and sufficiently close to the points A and B to be significant, is uniform, the potential center, or midpotential point I will coincide with the geometric center point IA midway between the points A and B. When the earth substructure has its uniformity disturbed by some anomalous condition such as a geological fault, a salt dome, an oil impregnated earth portion or an ore body close enough to the energization points A and B to significantly affect the relative potentials of earth surface points between the energization points, the midpotential point I will be displaced from the geometric midpoint IA. In addition to the location of the midpotential point I, the apparatus shown in Fig. 1 may be used to trace out equipotential lines $i$ extending transversely across the line A—B between the points A and B. In general, each such equipotential line shown in Fig. 1 is a section of a continuous curve. Each such continuous curve is in the form of a distorted circle surrounding one or the other of the energization points, as is explained in said prior patent.

The midpotential point may be located in other ways than by the adjustment of an exploring electrode as above described. For example, it may be indirectly located by measuring the potential changes occurring at a plurality of points along the line A—B when the energizing current is reversed. For example, as shown in Fig. 2, electrodes E', $E^2$ and $E^3$ may be located at fixed points distributed along the line A—B, and each connected to the reference potential point F by a separate observation circuit branch including an individual measuring device G. From the separate measurements of the potential differences between each of the different electrodes E', $E^2$ and $E^3$ and the reference potential point F obtainable with the different devices G, the potential gradient along the line A—B may be determined, and the location of the midpotential center may then be approximated, as is explained in the above mentioned Patent 1,841,376. Such separate measurements should be made simultaneously if the energizing current is not maintained constant.

In the prior use of the apparatus shown in Fig. 1, and of other apparatus disclosed in said prior patent, in the potential center method of exploration disclosed in said prior patent, it has been found necessary to use undesirably high earth energizing currents and voltage so as to minimize difficulties due to stray earth currents. Thus, for example, in such prior use of the apparatus shown in Fig. 1, it was found that with the earth energization points A and B separated by a distance of ten thousand feet and with the reference point F at a distance from the line A—B not less than about fifty thousand feet, it was found practically essential to employ an energizing voltage which was never less than about fifty volts, and usually was higher, and was sometimes as high as nine hundred volts. When the potential differences produced are measured and integrated in accordance with the present invention, the required field energizing current, and consequently the voltage of the source C, may be greatly reduced.

In my opinion the use of the present invention will make it possible to obtain good results with a field energizing current not more than 10 to 20 percent as great as that heretofore used in the potential center method of exploration. Thus, for example, in a typical field installation of the character contemplated in said prior patent in which the energizing electrodes are spaced 3500 feet apart, an energizing voltage of 500 volts would be practically suitable under conditions in which the energizing current would vary from 10 to 20 amperes. With the present invention, the amperage might well be reduced to one or two amperes, with a corresponding reduction in voltage. My above stated opinion is predicated in part on my experience in conducting many months of field use of the potential center method of exploration of earth portions for the purpose of locating oil deposits.

The apparatus shown in Fig. 1 includes a reversing switch DB and an integrating mechanism K not disclosed in said prior patent. The mechanism K integrates the measurements obtained with the device G. The reversing switch DB is similar to the switch D and is rotated by the same motor DA, and serves to connect the terminals 1 and 2 of the instrument G to conductors $e$ and $f$, respectively, during one half of each revolution, and to the conductors $f$ and $e$, respectively, during the other half of each revolution of the switch DB. The conductors $e$ and $f$ are connected to the exploring electrode E and to the reference point F, respectively. Switches M and MB are associated with the switches D and DB and advantageously adjusted by the motor DA for a purpose and in a manner hereinafter explained.

As shown, each of devices K and G includes an indicating pointer adapted to deflect in either direction from a zero position. The measuring device G should be of a type more rapidly and accurately responsive to changes in the voltage impressed on the observation circuit than a simple galvanometer which has been customarily used heretofore as the measuring device in the practice of the potential center method. Different forms of measuring and integrating apparatus adapted for use in the practice of the present invention are illustrated by way of example in Figs. 5, 6, 8, 9, 10 and 11 which are hereinafter described. Before describing the apparatus shown in the last mentioned figures, reference will be made to Figs. 3, 4 and 5 which illustrate and explain characteristic features of the present invention. Figs. 3, 4 and 5 are diagrams in which distances measured parallel to the base line O—X represent time intervals. In Figs. 3 and 4, distances measured parallel to the line Y—O—Y' above or below the line O—X respectively represent positive or negative voltages or potential differences. In Fig. 5, distances measured parallel to the line Y—O—Y' between different points along the line O—X and the line LB, represent integrated potentials at the respective times corresponding to said points.

In Fig. 3, the alternating full lines L and dotted lines L' represent the actual value of a potential difference which may be created by the energizing circuit shown in Fig. 1, when the energizing current is reversed at the end of each of successive equal time intervals $t$ of the order of 2 to 6 seconds each. For example, it may be assumed that the alternating lines L and L' represent the actual values of the component due to the energizing current, of the potential difference between points E and F of Fig. 1, when the reversing switch D is in continuous rotation and the reversing switch is stationary and the position of the electrode E remains unchanged during the measurements. In the normal operation of the apparatus shown in Fig. 1, however, the observation circuit connections are reversed by the switch DB simultaneously with the reversal of the measuring circuit by the switch D. In consequence, the measurements made by the device G of the actual values during the periods to which the dotted lines L' pertain, are not represented by those lines. On the contrary, those measurements are represented by the dotted lines $L^2$ at the opposite side of the base line O—X from the lines L'. On the assumption that the magnitude of the potential component due to the energizing current remains constant during the measuring period, the lines L and $L^2$ will collectively form a continuous straight line parallel to the line O—X, except for gaps between adjacent lines L and $L^2$, due to the fact that the measuring operation is interrupted at each reversal to provide time for current and voltage stabilization following each reversal of the energizing current. If the energizing current strength varies during the measuring period, the line collectively formed by the lines L and $L^2$ will not be a straight line.

In Fig. 4, the full lines $l$ and the dotted lines $l'$ are assumed to represent the actual values of the potential difference due to the stray earth currents, which would be measured by the instrument G of Fig. 1 during the intervals $t$ in which the measurements of Fig. 3 are made, if during those intervals the reversing switch DB were stationary, and no energizing current were impressed on the earth points A and B. In Fig. 4 the components due to stray earth currents included in the successive measurements actually made by the instrument G in its normal operation, are represented by the alternating curve sections $l$ and $l^2$. While in Fig. 3, the actual values of the potential component due to the energizing current are represented by full lines L above, and dotted lines $L^1$ below the line O—X, in Fig. 4 the actual values of the component due to stray earth currents are represented by full lines $l$ and dotted lines $l'$ which may be expected to be at the same side of the line O—X during a major portion of the measurement period.

It is to be noted in this connection that both components are included in the measurements reversed by the reversing switch DB and the further fact that the reversing switch D does not reverse the actual values of the component due to stray earth currents but does reverse the actual values of the component due to the energizing current. During different portions of the same measuring period, different portions of the line collectively formed by the full lines $l$ and dotted lines $l'$, may be at opposite sides of the line O—X for various reasons, and particularly as a result of the action of the device H shown in Figs. 1 and 2.

In Fig. 5 the line LA represents the integration of the component of the measured values represented in Fig. 3 by the lines L and $L^2$. The line LA is shown as a straight line and in practice it will be a straight line if the energizing current is maintained at a current value by the use of a suitable current regulator, as will be desirable in some cases. In some uses of the invention, however, it is not practically important to maintain a constant energizing current, and variations in that current will prevent the line LA from being a straight line. The curve $la$ of Fig. 5 represents an approximated integration of the component of the measured values represented in Fig. 4 by the lines $l$ and $l^2$. The dotted line LB of Fig. 5 represents the resultant of the values represented by the lines LA and $la$. As shown, the displacement from the line O—X of any point on the line LA is proportional to and increases with the distance of that point from the line Y—O—Y'. This consistent with the assumption that the potential values represented in Fig. 3 by the lines L and L' are of constant magnitude, so that the integrated quantity represented by the line LA progressively increases at a constant rate during the integration period. This is not the case with the integrated quantity represented by the line $la$ of Fig. 5. On the contrary, the average of that integrated quantity normally approximates zero. Ordinarily, each time interval $t$ during which the integrated value of the potential component due to stray earth currents increases, will be followed by an interval $t$ in which that integrated value decreases.

It is apparent, also, that when the intervals $t$ are small, the average of the voltage component values represented by any fairly large even number series of successive lines $l$ and $l^2$ may be expected to approximate zero, unless, as a result of some freakish condition, the voltage component due to stray earth current has positive and negative values regularly alternating with a frequency approximately the same as the frequency with which the commutator DB is rotated.

As is plainly apparent from Fig. 5, by suitably prolonging the integration period, the integrated value shown by the curve l*a* may be made as small in comparison with the integrated value shown by the curve LA, as may be desired. The actual length of the integration period which is suitable in any particular case will ordinarily depend upon the average instantaneous values of the two voltage components, and upon the extent which the conditions of use make it desirable that the integrated component value represented by the line LA should exceed the integrated component value represented by the line L*a*.

Assume, for example, an extreme case in which the average instantaneous value of the component of the measured potential difference due to stray earth currents is very much greater than the average instantaneous value of the component of the measured potential difference due to the energizing current. In such case, the integrated value of the component due to the energizing current during an integration period of a length customary when the difference in the average instantaneous values of said components is less extreme, might not result in an integrated value of the component due to the energizing current as great as the integrated value of the component due to the stray earth currents. By suitably prolonging the integration period in any such case, however, the integrated value of the component due to the energizing current may ordinarily be made as much greater than the integrated value of the component due to the stray earth currents as conditions may make desirable.

The difference between the integrated values of the components obtained at the end of a thousand successive time periods *t* would be ample for most exploration purposes, even in the extreme case in which the average instantaneous value of the stray earth field component is a hundred times the average instantaneous value of the other component. To integrate the components during a thousand successive periods *t* would require about thirty-three minutes if the energizing current were reversed at two second intervals and would require about an hour and forty minutes if the energizing current were reversed at six second intervals. With reversals effected at four second intervals and with the average instantaneous value of the measured component due to stray earth currents 5 to 10 times the value of the component due to the energizing current, integration over a measuring period of two to twenty minutes will ordinarily give results practically good enough for most exploration purposes. As those skilled in the art will understand, ordinarily it is practically desirable to terminate the integration period as soon as the results obtained are good enough from the practical standpoint.

Symmetry of the commutator or reversing switch DB is theoretically necessary in order that the sum of the number of alternate intervals *t* will equal the sum of an equal number of intervals *t* respectively following the first mentioned intervals. Correction for dissymmetry may be made by periodically interchanging the connections between the terminals of the instrument G and the brushes through which they engage switch DB at similar intervals, each equal to the sum of one or more pairs of intervals *t*. Such interchange of the connections between the instrument G and reversing switch DB requires the substantially simultaneous interchange of the connections between the brushes engaging the switch D and the conductors 3 and 4 through which said brushes are connected to the energization points A and B. The connections should be so interchanged during an interval in which the switch D opens the energizing circuit and in which the switch DB disconnects the device G from the measuring circuit.

The connection interchanges may conveniently be made by means of two double pole, double throw switches M and MB in Fig. 1. As there shown, the switch M has its pivoted blades interposed between the conductors 3 and 4 and the associated brushes engaging the switch D, while the pivoted blades of the switch MB are interposed between the terminals 1 and 2 of the instrument G and the associated brushes engaging the switch DB. As diagrammatically shown, the movable blades of the switches M and MB are connected for simultaneous adjustment by a parallel motion link *m*. Advantageously, the switches M and MB are automatically operated by motor DA through suitable mechanical or electrical connections. As shown in Fig. 1, the link *m* is automatically adjusted longitudinally alternately in opposite directions by successive energizations of a quick acting electromagnetic mechanism MC. The mechanism MC is energized by a control switch mechanism MC' including a switch actuator $MC^2$ rotated by the motor DA through a speed reducing gearing $MC^3$. As diagrammatically shown, the energizing current for the device MC is supplied by branches of the energizing conductors for the motor DA.

When a field energizing current is maintained constant during an integration period or periods suitably prolonged to accurately determine the line LA for one or more positions of the exploring electrode E of Fig. 1, much useful information is thereby obtainable. As will be apparent, the tangent of the angle of inclination of the line LA to the line O—X is a direct measure of the potential difference due to the energizing current between the electrodes E and F of Fig. 1. Thus from two suitably determined lines LA, the potential difference between any two points in the same energized field may be ascertained. Furthermore, when with my invention, those two points are related to the field energizing electrodes as are the two intermediate electrodes in the well-known Gish-Rooney four electrode method of measuring apparent average specific resistivities disclosed in the Gish Patent 1,813,845 of July 7, 1931. That resistivity can be deduced without the rapid reversal of the energizing current which is a distinctive characteristic of the Gish-Rooney method. Those rapid reversals result in skin effects which have limited the depth of penetration heretofore practicable with that method. The determination of the difference in potential between any two points by the method in which two lines LA are produced as described is applicable to ascertain both the direction or sign of the potential difference and the amount of the difference. The Gish-Rooney method of determining apparent specific resistivity involves the application of a mathematical equation involving a proportional relation of the potential difference measured and the energizing current. In lieu of using the above-mentioned mathematical relation of the measured potential difference to a constant energizing current, I may use an analogous relation of the integrated potential difference to the integrated value of a variable energizing current and thereby obtain approximately the same apparent specific resistivity. The energizing current may be integrated by means of any one of various known current integrators.

The measuring apparatus shown in Figs. 6 and 7 is adapted for use as, or in lieu of, the more conventionally illustrated measuring device G and associated integrating mechanism K shown in Fig. 1. As shown in Fig. 6, the leads 1 and 2 from the brushes of the commutator type switch DB are connected to the input circuit of the first stage N of a two-stage amplifier. The amplifier stage N is diagrammatically illustrated as of conventional balanced bridge type comprising two electronic triode valves $n$ and $n'$ having their anodes connected by a resistance 5 and having their filament cathodes connected to the midpoint of the resistance 5 by a battery 6. The latter thus serves as a source of current in the plate circuit of each valve. As shown, a battery 7 supplies heating current to the filaments of both valves $n$ and $n'$. A biasing battery 8 connects the cathodes of both valves to the midpoint of a resistance 9 connecting the control grids of the two valves and supplies negative grid bias.

To prevent the transmission of stray alternating voltages to the amplifier, the conductors 1 and 2 are connected to the terminals of the resistance 9, and thereby to the control grids of the two valves through inductances 10, and are interconnected by condensers 11, the inductances 10 and condensers 11 collectively forming a conventional filter. Means are advantageously provided for relatively adjusting the circuits of the two tubes $n$ and $n'$ to maintain them in properly balanced relation so that the voltage output of amplifier stage N will be zero when the input voltage to the stage is zero. The adjusting means shown consists of a potentiometer N' connected between the control grid and cathode of the valve $n'$.

The output terminals 12 and 13 of the amplifier stage N connect the terminals of the resistance 5 directly to the input circuit of the second amplifier stage NA. The latter may be, and as shown is, identical with the first amplifier stage N.

The output terminals 14 and 15 of the amplifier section NA, and therefore of the amplifier as a whole, are connected to the winding $g'$ of a measuring device GA. The measuring device GA, as shown, is like a conventional watt-hour meter in that it includes a direct current motor $ga$ comprising two field windings $g^1$ and $g^2$ in association with a D. C. armature $g$ and its commutator $g^3$. The field winding $g^2$ and armature winding of instrument GA are connected in series with a source of current $g^4$ and a rheostat $g^5$. The armature shaft carries a conducting disc $g^6$, a peripheral portion of which turns between the pole pieces of a permanent magnet $g^7$ and thus subjects the armature to a dynamic braking or load force proportional to the speed of rotation of the armature.

In the contemplated operation of the measuring device GA, the rheostat $g^5$ is so adjusted that with no current flowing in the field winding $g^1$, the current flow through the winding $g^2$ will cause the motor to rotate with a predetermined speed. Then when current flows through the winding $g^1$ it increases the speed of the motor above or decreases the speed of the motor below the predetermined speed, accordingly as the direction of current flow through the winding $g^1$ is in one direction or the other. The precise value of the predetermined speed at which the motor is rotated by current flow in the winding $g^2$ alone, is not of itself important, but it should be high enough to prevent reversal of the direction of motor rotation by any expected current flow in the winding $g^1$.

The device GA includes a second motor $gb$ which may be a duplicate of the motor $ga$, except that it includes no field winding corresponding to the winding $g'$ of motor $ga$. The rheostat $g_5$ of the motor $gb$ is so adjusted that the armature of the motor $gb$ rotates continuously at a speed equal to the predetermined speed of rotation of the motor $ga$ when the winding $g'$ of the motor $ga$ is not energized. With the motor $gb$ rotating at a constant speed and with the motor $ga$ rotating with a velocity which is equal to or greater or smaller than the velocity of the motor $gb$, depending on the magnitude and direction of the voltage impressed on the input circuit of the amplifier stage N, an integration of the relative angular movements of the two motors is a measure of the integrated value of the voltage impressed on said input circuit.

An integration of the relative angular movements of the two motors may be obtained in various ways. Advantageously, it is obtained in some manner which imposes no load or resistance to movement on either motor. One arrangement for the purpose includes the use of photoelectric relays KA and KB shown in Fig. 6. The relay KA is intermittently energized or actuated by the motor $ga$ when in rotation, with a frequency proportional to the speed of motor rotation. This result is obtained, as shown, by forming radially extending black surface lines $g^8$ and alternating light lines on the underside of the disc $g^6$ of the motor $ga$ as shown in Fig. 7. A stationary shield $g^9$ at the underside of the disc $g^6$ is formed with a slot $g^{10}$ with which the lines $g^8$ are successively brought into register.

The slot $g^{10}$ is in register with the lens or light-receiving inlet $k'$ of the relay KA and as each line $g^8$ moves into register with the light inlet $k'$, the motor or other power element of the relay gives a partial revolution of predetermined extent to the relay output shaft $k^2$. As diagrammatically shown, the motor or other power element of the relay KA is energized by a battery $k^3$. The photoelectric relay KA may be of a type which is well known and in general use, and constitutes no part of the present invention. Further description of the relay KA is therefore unnecessary.

A second photoelectric relay KB, which may be an exact counterpart of the relay KA, is actuated by the lines $g^8$ on the brake disc $g^6$ of the motor $gb$, to give corresponding intermittent movements to the shaft $k^2$ of the device KB. The two shafts $k^2$ are separately connected to the two aligned bevel driving gears O' and O'' of a differential mechanism O including a rotatable annular driving element O² which is coaxial with said bevel gears. The element O² supports one or more bevel gears O³ each meshing with each of the gears O' and O'', and each rotating about an axis radial to the axis of rotation of the elements O². The latter is maintained in a stationary position when the motors $ga$ and $gb$ are rotating at the same speed since the gears O' and O'' always rotate in opposite directions. When the motor $ga$ is rotating at a speed less than the constant speed of the motor $gb$, the annular element O² is rotated in one direction and when the speed of the motor $ga$ is higher than that of the motor $gb$, the annular member $O^2$ rotates in the opposite direction. In consequence, the aggregate angular movement of the annular member $O^2$ during an observation period is proportional to the integrated value of the potential difference measured during said period whether the duration of the period is one minute or one hour or is something different.

As shown in Fig. 6, the annular member $O^2$ is provided with spur gear teeth $O^4$ at its periphery in mesh with a spur gear P secured on a shaft P'. The net angular movement of the gear P is totalized by a tally or register PA comprising a train of counting wheels. Conveniently, a second tally or register PB is employed to totalize the net angular movement of the gear P, and the two tallies are so arranged that when the net angular movement of the gear P during an observation period is in one direction or in the opposite direction, it will be directly shown by the tally PA or by the tally PB respectively, and will be indirectly shown by the other tally. Thus in the arrangement shown, when the net angular movement of the gear P during an observation period is the result of an aggregate rotative movement of the motor $ga$ greater in extent than the aggregate angular movement in the opposite direction of the motor $gb$, the difference in the angular movements of the two motors will be shown directly by the tally or register PA, which I call the plus tally. When the net angular movement of the motor $ga$ is less than that of the motor $gb$ during an observation period, the difference in the rotative movements will be directly shown by the tally or register PB which I call the minus tally.

Ordinarily each of the number wheels of each tally is of conventional form, being provided with a peripheral series of symbols comprising a zero and the digits 1–9, and the wheels are arranged so that the unit wheel of each tally makes one revolution for each revolution of the gear P, and each other wheel is given a tenth of a revolution for each complete revolution of the adjacent wheel of lower order. Each tally includes five number wheels, and as shown is adapted to register revolutions from one up to 99,999, and may be reset so that at the beginning of each observation period the reading of each tally is 00000. Each of the number wheels of the tally PB is desirably reversed with respect to the number wheels of the tally PA so that the numbers 1, 2, 3, etc. of the wheels of one tally run around the shaft in a direction opposite to that in which the same numbers of the wheels of the other tally run. In consequence, if during a particular observation period the angular movement of the motor $ga$ so exceeds the angular movement of the motor $gb$ that at the end of the period the plus tally PA reading is the number 358, for example, the minus tally reading will be 99,642. Similarly, if during an observation period the angular movement of the motor $gb$ exceeds the net angular movement of the motor $ga$ by an amount producing a minus tally reading of 250, then the number shown by the plus tally will be 99,750. Under certain conditions of use, the ability to directly read net plus revolutions on the tally PA, and to directly read net minus revolutions of the gear P on the tally PB, is practically desirable.

As will be apparent, a record of the rotative movement of the gear P, or of a gear in mesh therewith, during an observation period, is a record of the integrated value of the measured earth current or potential during the observation period. Such a record may be made in various ways, as for example by the known photographic method in which a light beam is deflected in accordance with the movement of the gear across the surface of a traveling strip of photographic material. As shown in Fig. 9 however, apparatus actuated by the gear P is employed to make a pen record of the net angular movement of the gear P during each observation period.

In the arrangement shown somewhat diagrammatically in Fig. 9 the gear P proportionally rotates the gear $p$ directly, or preferably and as shown, through speed reducing gears $p'$. The gear $p$ is secured to a shaft $p^2$ comprising a threaded portion on which a half nut $p^3$ normally rests, and is in threaded engagement therewith. The half nut $p^3$ is carried by an arm $p^4$ having a hub portion surrounding a shaft $p^5$ parallel to the shaft $p^2$. Said hub portion is adjustable longitudinally of, and angularly about the axis of the shaft $p^5$. The arm $p^3$ carries a pen $p^6$ adapted to make a record $p^7$ on a traveling record chart strip $p^8$ of the changes in position of the half nut $p^3$ longitudinally of the shaft $p^2$ produced by the rotation of the latter during each observation period. As shown, the chart strip $p^8$ is formed with a central zero line $p^9$. Preparatory to each observation period, in normal operation, the half nut is raised out of engagement with the threaded shaft $p^2$ and is then reengaged with the shaft $p^2$ after being moved longitudinally of the latter into the position in which the pen is in register with the zero line $p^9$. Then at the end of the observation period, the record $p^7$ traced during the period shows how the integrated value of the quantity measured has varied during that period. If the apparatus shown in Fig. 9 were used to measure and integrate the potential differences jointly due to stray earth currents and to an energizing current in an exploration field in which said currents vary as they are assumed to vary in Fig. 5, the curve $p^7$ shown in Fig. 9 would be similar to the curve LB shown in Fig. 5.

In the practice of the method illustrated in Figs. 1–7 as hereinbefore described, the potential component due to stray earth currents is subject to rapid and erratic variations in magnitude and direction, and thus creates what may be termed a chaotic potential background for the potential component due to the energizing current. It is theoretically possible to substantially eliminate or neutralize the chaotic background potential component by rapid rotation of the commutator switches D and DB. In practice, however, the frequency of reversal will ordinarily be such that the time interval between successive reversals is of the order of two to six seconds to thereby avoid risk of measuring inaccuracies resulting from the so-called "skin effect" and from inductive effects on the distribution of the energizing current flow through the earth. Moreover, it is practically essential to keep the observation circuit open during each reversal operation for a short time interval to insure the elimination of inductive effects in the observation circuit resulting from the circuit reversals. In Figs. 3, 4 and 5 no attempt has been made to show the effects of the intervals during which the observation circuit is open, and in this connection it is noted that the hereinafter mentioned integration curves $p^7$ of Fig. 9 and LC of Fig. 10 cannot be theoretically accurate, unless in the case of each curve, the movement of the corresponding record strip is interrupted during the time intervals in which the corresponding observation circuit is open.

In each complete cycle the inductive effects produced by the interruptions due to the continuous operation of the commutator type reversing switches D and DA, will cancel out if the two commutator segments of the switch D are spaced more widely apart than the two commutator segments of the switch DB. Such inductive effects may be eliminated in other ways. For example, the commutator segments of the switch DB may be spaced apart to an extent sufficiently greater than are the segments of the switch D to permit the inductive effects to die out so that the energizing current will reach its equilibrium value while the observation circuit is open. In this arrangement the space should also be fixed as to again open the observation circuit before the energizing circuit is opened.

Since the successively measured values of the potential component due to the energizing current are unidirectional, the integrated value of those measurements is equal to the average value of the component multipled by the number of intervals or time units $t$ included in each observation period. It is thus possible by suitably prolonging the observation period, to make the integrated value of the potential component due to the field energizing current as great as may be desired.

No such continuous building up of the integrated value of the potential component due to stray earth currents can occur, except in the highly improbably event that the last mentioned should be alternately plus and minus with a frequency of alternation equal to the frequency of the circuit reversals effected by the reversing switches D and DB, and in the particular phase relation required for such continuous building up action. If the two mentioned frequencies are not identical, but are quite close together, the integrated value of the potential component due to stray earth currents may periodically build up to values high enough to be disturbing, although the successively attained maximum values will be opposite in direction and tend to neutralize one another.

Errors due to such abnormal or unusual fluctuations in the potential component due to the stray earth currents can be detected and avoided or suitably reduced, by making repeated sets of measurements and rotating the reversing switches at different speeds in making the different sets of measurements. Alternatively, errors due to the abnormal or unusual frequency relation mentioned above may be detected and corrected for by rotating the reversing switches at different speeds during different portions of a single suitably prolonged observation period.

When it becomes desirable to compare the integrated values obtained during observation periods of unequal length, one integrated value may be increased or the other may be decreased to make the two integrated values correspond to similar observation periods. Alternatively, each integrated value may be divided by the length of the corresponding integration period in which it was made. The reversal of the energizing circuit and the reduction in magnitude of the energizing current eliminate, or greatly reduce the tendency otherwise encountered to objectionable polarization of the electrodes or contacts which are in contact with the earth and are included in the energizing and observation circuits.

As previously explained, the instrument GA may be similar to an ordinary watt-hour meter except in respect to the connections made to its field coils. For the contemplated use of the device GA, its winding $g'$ may have many times the number of turns or convolutions included in the correspondingly located current coil of the watt-hour meter. Such increase in turns or convolutions proportionately decreases the magnitude of the current which can be measured and integrated with suitable accuracy. Thus, if a given watt-hour meter will accurately measure and integrate the wattage corresponding to the flow through its current coil of a .07 ampere current, the instrument GA with one hundred times as many turns or convolutions as said current coil, will measure and integrate, with similar accuracy, the potential difference represented by a current of .0007 ampere in the coil $g'$.

As will be readily apparent to those skilled in the art, integrating meters of other types may be used in lieu of the watt hour type meter GA shown in Fig. 6. For example, use may be made of an instrument of the type known as an ampere-hour meter, and use may also be made of a silver coulomb meter in which silver is transferred from one electrode to the other electrode of an electrolytic cell at a rate proportional to the potential difference between the electrodes. In such a meter a reversal in the direction of current flow through the cell reverses the direction in which silver is transferred from one electrode to the other.

It is possible also to replace the apparatus shown in Fig. 6 by a combination comprising an integraph and a self-balancing potentiometer GC having high speed rebalancing mechanism tending to maintain the potentiometer circuit continuously in balance. For example, the potentiometer may be of type disclosed in the Wills Patent 2,423,540 of July 8, 1947.

One use of such a potentiometer GC is illustrated diagrammatically in Fig. 10, in which the bridge circuit of the instrument GC is conventionally shown as comprising two resistances 20 and 21 connected in parallel with one another and each in series with a battery 22 or other suitable source of D. C. voltage. A slider contact 23 engages and is adjustable along the length of the resistance 21. As diagrammatically shown, the contact 23 is carried by a pen carriage 24 in threaded engagement with a threaded spindle 25 alongside the resistance 21 and forming an extension of the armature shaft of a reversible alternating current motor GC'. The pen carriage 25 carries a pen or other recording element 26 for tracing a record curve $t'-t^2$ on a travelling strip chart 27.

In the particular arrangement shown, one of the brushes engaging the commutator segments of the reversing switch DB is connected by a conductor 28 to the contact 23. The connection between the last mentioned brush and the bridge point 29 comprises a conductor 30 which connects said brush to one input terminal 31, and a conductor 33 which connects the point 29 to the second input terminal 32 of the amplifier element GC² of the instrument GC, the terminals 31 and 32 being connected by an input circuit portion of the said amplifier.

In the normal balanced condition of the potentiometer shown in Fig. 10, the potential difference impressed on the reversing switch DB by the brush connected to the exploring electrode E and the brush connected to the distant or base potential point F through the potentiometer H, is directly balanced by the opposing potential difference existing between the point 29 of the resistance 20 and the point of the resistance 21 engaged by the contact 23. In that condition of the apparatus, there is no current flow through the circuit including the conductors 28, 32 and 33, and the input terminals 31 and 32 of the amplifier GC are then at the same potential with the motor GC' at rest. When a potential difference is impressed on the input terminals 30 and 31, the motor GC' is energized for operation in the direction and to the extent required for the adjustment of the contact 23 along the resistance 21 required to eliminate the potential difference between the amplifier input terminals 31 and 32 and thus rebalance the potentiometer circuit.

The amplifier $GC^2$ is of the type comprising means for converting direct current flowing through the conductors 30 and 33 and the amplifier input circuit connecting those conductors into alternating current of the voltage frequency, ordinarily 60 cycles per second, across the alternating current supply conductors 34 and 35 connected to the amplifier energizing terminals 36 and 37. The motor GC' comprises a squirrel cage type rotor 38, a power winding 39 connected in series with a condenser 40 across the supply conductors 34 and 35, and a control winding 41 connected between the output terminals 42 and 43 of the amplifier $GC^2$. The winding 41 is shunted by condenser 44. In the operation of the apparatus shown in Fig. 10, a change in the potential of the exploring electrode E relative to the reference electrode F, produces a flow of direct current through the input circuit of the amplifier $GC^2$. The latter includes means for converting that direct current into alternating current of a frequency equal to the frequency of the alternating current supplied by the conductors 34 and 35. That alternating current has one phase or a second phase displaced 180° from the first phase depending on the direction of direct current flow between the conductors 30 and 33. The direction of the current flow between the conductors 30 and 33 thus determines whether the current flow through the motor winding or control winding 41 leads or lags the current flow through the power winding 39, and thereby causes the motor GC' to rotate in the direction required to adjust the contact 23 along the slide wire resistance 21 in the direction needed to make the potential of the contact 23 equal to that of the bridge point 29. The attainment of such potential equality thus rebalances the bridge, eliminates current flow between the conductors 30 and 33, and interrupts the rotation of the motor GC'.

As those skilled in the art will recognize, information similar to that afforded by the dotted line curve LB of Fig. 5, can be obtained by the use of a planimeter from the portion of the chart 27 curve of Fig. 10, between the points $t_1$ and $t_2$ corresponding to the beginning and end, respectively, of an observation period.

A curve analogous in character to the curve LB of Fig. 5 can be obtained also by the use of integraph mechanism R of know form associated with the self-balancing potentiometer GC of Fig. 10. The integraph mechanism R shown diagrammatically in Fig. 10, comprises a measuring or value arm R' angularly adjusted in accordance with changes in value of the potential measured by the instrument GB. As shown, the arm R' is so adjusted through its pin and slot connection with a nut or carriage 45 adjusted by the threaded rebalancing spindle 25 of the instrument GB. The integraph R also comprises a pivoted integrating arm $R^2$ carrying a recording member $R^3$ which traces a curve LC on a record chart $R^4$.

At the beginning of each observation period, the integrating arm $R^3$ is adjusted into its zero position in which the marker $R^3$ engages the record chart $R^4$ at a point along its zero or center line $R^5$. During the observation period the marker $R^3$ moves transversely of the record chart so that at any instant during the observation period its displacement from the line $R^5$ is equal to the integrated value of the potential difference having its value indicated at each instant by the position then occupied by the value arm R'. Assuming similar observation periods and potential differences, the curve LC traced by the marker $R^3$ of Fig. 10 would be similar to the curve LB of Fig. 5. As previously indicated, the curve LC would be precisely similar to the curve LB of Fig. 5, if the integraph R included provisions for interrupting the feed of the record strip during the intervals in which the observation current is opened in connection with the reversal of the energizing circuit.

In Fig. 11 I have diagrammatically illustrated the use of the measuring apparatus shown in Fig. 10 to actuated integrating apparatus which may be like that shown in Fig. 6. Thus, in Fig. 11 the integraph adjusting element 45 of Fig. 10 is replaced by a similarly adjusted nut or carriage element 45' carrying a slider contact 23'. The latter is moved as the shaft 25 is rotated in one direction or the other by the motor GC', in one direction or the other along the slide wire resistance of a bridge circuit comprising elements 20', 21' and 22' corresponding generally to the elements 20, 21 and 22, respectively, of Fig. 9. The energizing current source 22' of Fig. 11 however is of substantially higher voltage than the battery 22 of Fig. 10. The resistors 20' and 21' of Fig. 11 are also adapted to pass currents substantially larger than are passed by the resistors 20 and 21 of Fig. 10. In Fig. 11, the fixed intermediate point 29' of the resistor 20' is connected by the conductor 46 to one terminal of the energizing coil g of the motor ga of an integrator mechanism GA', while the slider contact 23' is connected by a conductor 47 to the second terminal of said winding g'.

The integrator mechanism GA' of Fig. 11 may be identical with the integrator mechanism GA of Fig. 6. As shown, however, the elements $g^9$ and KA and KB of Fig. 6 are omitted in Fig. 11 and the differential gear mechanism for rotating the integrator shaft P' of Fig. 11 is gear connected to the armature shafts of the motors ga and gb of Fig. 11. As shown, the shaft of the motor ga is threaded and rotates a worm gear 48a, the shaft 49a of which is directly connected to and rotates the gear O' of the differential mechanism, while the similarly threaded shaft of the motor gb of Fig. 11 is in engagement with, and rotates a worm gear 48b which is connected to and rotates the differential gears O'' through a common shaft 49b. As will be apparent, with the arrangement shown in Fig. 10, the energizing currents supplied to the windings of the motors ga' and gb' may be large enough to enable the motors to rotate the differential gears O' and O'' and thereby actuate the counting trains of the integrating mechanism of Fig. 6 without interfering with the operation of the motor ga in predetermined accordance with the potential between the slider contact 23 and bridge point 29 of the measuring apparatus shown alike in Figs. 10 and 11, and without interfering with the rotation of the motor 9b at a predetermined constant speed.

In Fig. 8 I have illustrated another form of apparatus for amplifying and integrating the potential difference between the conductors 1 and 2 of Fig. 1. The apparatus shown Fig. 6a was especially devised for amplifying and integrating small thermocouple voltages, and is illustrated and described by E. A. Hamacher in the "Review of Scientific Instruments," a well known periodical, in its October 1946 issue, vol. 17, pp. 364–368. In Fig. 6a the conductor 1 is connected to the polarized vibrating element or reed 50 of a current interrupted of the vibrator type, in which the reed is caused to vibrate with the frequency of the alternating current passing through the energizing coil 51 of the vibrator. As the reed 50 vibrates, it alternately engages stationary contacts connected to the opposite ends of a coil 52. The midpoint of the coil 52 is connected to the conductor 2 by a conductor. When conditions are such that the potentials of the conductors 1 and 2 are unequal, the vibrations of the reed 50 will cause unidirectional current to flow alternately to or away from the conductors 53 through the upper and lower portions of the coil 52. The latter constitutes the primary coil of a transformer 54, and the pulsating unidirectional current flow alternately through the upper and lower sections of the coil 52 induces an alternating current voltage in the secondary winding 55 of the transformer.

The voltage induced in the secondary winding 55 of the transformer 54 is proportional in magnitude to the potential difference between the conductors 1 and 2 and will be of one phase or the opposite phase accordingly as the potential of the conductor 1 is greater or less than that of the conductor 2, and will be of the same frequency as the alternating current flowing through the energizing winding 51 of the vibrator. In Fig. 8 the winding 55 impresses a control signal on a control grid of a single stage preamplifier triode 56, having its cathode connected to the conductor 2 and its anode connected to a conductor 57 serving as a high voltage source of D. C. current. The latter has its cathode connected to the conductor 2 and has its anode connected to a voltage source of +310 volts through an inductance 58 and a plurality of resistances 59, all connected in series in a conductor 57. Filter condensers 60 are connected to the terminals of the inductance 58, and to the junctions of the various resistances 59.

The triode 56 has its output circuit connected to the input circuit of a multistage amplifier comprising a triode 61, a pair of triodes 62 and 63 and a pair of pentodes 64 and 65. The latter are connected in push-pull fashion and their output circuits are connected through a transformer 66 through which they energize the control or current winding 67 of an alternating current watt meter GD and a rectifier 68 which directly energizes a direct current pen recorder 69.

The watt meter GD includes a rotor 70 rotated by the magnetic field created conjointly by the control winding 67 and a power winding 71. The latter is connected in series with a condenser across supply conductors 72 and 73 which may supply alternating current at 110 volts, and a frequency of 60 cycles per second. As shown, the conductors 72 and 73 supply energizing current to the vibrator coil 51 through a step-down transformer 74.

The essential elements of the apparatus shown in Fig. 8 may be commercially available elements of the character described in the said Hamacher article, wherein the electronic valves 56 and 61 are of the 6F5 and 6C5 types, respectively; the valves 62 and 63 are triode elements of a twin tube of the 6N7 type, and the pentodes 64 and 65 are of the 6F6 type. As described in said article, the pen recorder 69 is a rugged 5 milliampere D. C. pen recorder, and the watt meter GD is a commercial 5 ampere, 110 volt A. C. instrument having its gear train modified to increase the speed of its totalizing dials and having its current or control coil rewound to include more wire and thus increase the sensitivity of the meter. Each of the amplifier valves is supplied with anode voltage by the conductor 57. The control grids of the pentodes 64 and 65 are supplied with bias voltage by a conductor 75 at a voltage of −30 volts. The control grid of the valve 61 is connected to a slider contact through slide wire resistance 76 in the output circuit of the preamplifier triode 56. The control grid of the valve 62 is connected to the anode of the triode 61 by a capacitative coupling. The control grid of the valve 63 is connected to the conductor 2 through a resistance and is connected to the biasing conductor 75 through a conductor.

The Fig. 8 apparatus in the form described in the Hamacher article is adapted to provide full five milliampere output with maximum input of one millivolt, a noise level of not more than one percent of the full scale response, good stability and absolute linearity. The Hamacher article states the values of the various impedance elements included in the circuit network. For much of its electrical prospecting uses contemplated herein the operating characteristics of the apparatus described in the Hamacher article are appropriate, and their modification to meet different conditions may be readily effected by those skilled in the art. Further description herein of the Fig. 8 apparatus seems unnecessary.

In Fig. 10, as in Fig. 8, the indirect amplification of a minute unidirectional potential difference by its conversion into an alternating potential difference of predetermined frequency, and the direct amplification of the alternating potential difference, permits of a relatively high linear amplification.

Moreover, in such amplification there is little or none of the tendency to "drift" and instability experienced in the direct amplification of a minute unidirectional potential difference, unless use is made of special amplifier provisions which involve apparatus complications and expense which are undesirable in many cases. The periodical reversal of the direction of energization of an earth field of exploration and of the observation circuit, in conjunction with the integration of the measured potential differences during suitably prolonged periods, permit of a greater reduction in the objectionable effects of stray earth currents than has been possible heretofore. This permits good exploration results to be obtained with smaller energizing currents than have been required heretofore. The duration of the period in which the potential difference between two points is integrated may vary widely with conditions, but ordinarily will not be less than about five minutes and usually will not be longer than one or two hours. As will be apparent, the general advantages resulting from the integration of the measured potential differences are obtainable with known apparatus for, and methods of integration different from those illustrated and described herein by way of example.

As previously pointed out, some of the features and principles of the present invention may be utilized with advantage in the exploration of a field of exploration in which the potential differences measured are wholly due to stray earth currents. While the potential differences produced by stray earth currents in an exploration field not artificially energized, ordinarily include some components due to unpredictable and rapidly varying earth currents, they also ordinarily include other components due to earth currents which change more slowly and which are significantly predictable. It has long been well known that some earth currents having a predictable general pattern are subject to long period, or diurnal, variations, which are generally believed of solar origin and to involve the rotation of the earth about its axis. Other earth currents vary rapidly and unpredictably though some of the last mentioned earth currents may also, be due to magnetic storms resulting from solar action. It is thought probable, also, that some earth current affects may be due to the same gravitational changes which produce tides.

While the above-mentioned characteristics of, and differences between earth currents have long been known to the workers in the electrical prospecting art, I believe I am the first to recognize that it is practically feasible and desirable to minimize the effect of the rapid and unpredictable earth current variations by integrating the potential difference measurements. In general the integration of the potential differences due wholly to stray earth currents augments the value of the information obtainable from the measurements, by augmenting the effect of the components which change slowly and are more or less predictable, relative to the effect of the components which change rapidly and are practically unpredictable.

For the attainment of satisfactory results in the exploration of an exploration field not artificially energized for exploration purposes, by measuring potential difference as hereinafter described, it is practically essential that the potential relations of different points in the field should be determined by simultaneous potential measurements. It is highly desirable also that the measurements simultaneously made at the different earth points should be so made as to permit their direct comparison, and that they should be integrated in such manner that the integrals of the different measurements may be readily compared.

One apparatus arrangement for use in exploring a field not artificially energized for the purposes of exploration, is diagrammatically illustrated in Fig. 12. In that figure the symbols $S^1$, $S^2$, etc. designate distributed earth points in a field to be explored, and $G^1$, $G^2$, etc., designate measuring devices separately associated with said points. Preferably each measuring device includes, or controls the operation of, an integrator mechanism. In Fig. 12, each of the devices $G'$, $G^2$ is associated with and controls an integrating or totalizing device K, generally as shown in Fig. 1, and each device $G'$, $G^2$, etc. is employed to measure the difference between the potential at a corresponding one of the points $S'$, $S^2$, etc., and a base potential. That base potential may be the potential of some earth point or of a plurality of earth points so connected as to create a base potential which is an average or composite effect of the potentials of each of said earth points. It will be convenient in some cases to use as the base potential point, a point like the point F of Fig. 1 which is remote from the observation field. In some cases, it will be convenient to make the base potential an average or joint function of the potentials of some, or all of the observation points, or of the points close to the respective observation points.

Such an average earth potential is provided in Fig. 12 by means including electrodes or earth contacts at points $T'$, $T^2$, etc., respectively adjacent the joints $S'$, $S^2$, etc. and each connected in a potential averaging circuit network. As shown that network includes a separate resistor U, of high resistance, through which each of the earth points $T'$, $T^2$, etc. is connected to the average potential point T of the network. Each of the points $T'$, $T^2$, etc., is thus connected to each other point by two resistors in series with one another.

As diagrammatically shown, each of the instruments $G'$, $G^2$, etc., is employed to measure the potential difference between the corresponding one of the earth points $S'$, $S^2$, etc., and the average potential point T. To this end, each of the instruments $G'$, $G^2$, etc., is directly connected to the output terminals of an amplifier NB individually associated with that instrument. Each amplifier NB has one of its input terminals connected by conductors 79 and 80 to the average potential point T, and has its second input terminal 82 connected to the associated one of the plurality of earth points $S'$—$S^8$ by a corresponding one of a plurality of conductors 81—88. The amplifiers NB may each be like the two-stage amplifier N, NA, shown in Fig. 7, and each of the measuring devices $G'$—$G^8$ of Fig. 1 may include an indicating pointer adapted to deflect in either direction from a mid or zero position. Advantageously, and as shown, the various instruments $G'$—$G^8$ and a clock V are so grouped that simultaneous readings of the different instruments $G'$—$G^8$ and the clock V may readily be shown on each of a series of photographs made at suitably frequent intervals during each observation period. Each photograph so made thus shows the simultaneous values of the potential differences between each of the various earth points $S'$—$S^8$ and the average potential point T. In lieu of the devices $G'$—$G^8$ and associated totalizers K of the type shown in Figs. 1 and 6, use may well be made of such apparatus as that illustrated in Figs. 8, 9 or 11.

In the particular arrangement shown in Fig. 12 each of the instruments $G'$—$G^8$ is individually associated with and actuates a corresponding integrator $K'$—$K^8$. The integrators $K'$—$K^8$ are shown as arranged so that each of the above-mentioned photographs may show the readings of the integrators $K'$—$K^8$ as well as the readings of the measuring devices $G'$—$G^8$, and of the clock V. Such photographs make it possible to rapidly and accurately compare the potential difference integrals made during the corresponding particular portions of the observation period. They also make it readily possible to compare the relation between the integral and instantaneous values of each of the potential differences at different stages of each observation period.

Other measuring and integrating devices may be used in lieu of the measuring devices G', G², etc., and the integrators K', K², etc., shown in Fig. 9. For example, each of the instruments G', G², etc., and the associated amplifier NB and integrator K', K² or K⁸, may be replaced by a single self-balancing, recording potentiometer like the potentiometer GC shown diagrammatically in Fig. 10. The potentiometer GC so used, may or may not be associated with a corresponding integraph as shown in Fig. 10. In some cases it may be practical to replace a plurality of the measuring and integrating units shown in Fig. 12 by apparatus such as a single, so-called multiple point, self-balancing potentiometer, operating automatically to rapidly measure a plurality of potential differences in repeated sequence. Such sequential measurements necessarily permit of variations in the relative potentials successively measured in each sequential measuring operation. In some cases, those variations may make the information obtained from the measurements materially less valuable than the information obtainable from simultaneous measurements.

The information obtained in the practice of the method illustrated in Fig. 12 may be utilized in various ways. In particular, the measurements of the potential relations at the different points S', S², etc. make it possible to plat equipotential lines X on the map W of the exploration field including the points S', S²—S⁸, which is shown in Fig. 13. As those skilled in the art understand, the lines X are the lines of intersection with the surface of the earth of imaginary equipotential surfaces within the earth, each of which is transverse at all points to the earth currents repectively intersecting the surface at said points. While a substantial portion of an equipotential surface may closely approximate a plane surface, equipotential surfaces are usually warped surfaces. It is well known, for example, that the equipotential surfaces intersected by the current flow between the energizing electrodes A and B of Fig. 1, will ordinarily be in the form of sections of the surfaces of distorted spheres.

Equipotential lines, such as the lines X of the map W which are mainly due to slowly changing stray earth currents, and are platted from the integrals of measurements made as above described during an observation period of suitable length, will be approximately parallel unless made non-parallel by geological faults, salt domes, ore bodies local current sources or other abnormal or non-uniform conditions in the earth's structure or composition beneath or adjacent the field of exploration shown by said map. Variations from parallelism of adjacent equipotential lines may thus indicate anomalous subsurface earth conditions, and the character of the non-parallelism may be such as to indicate the probable character or cause of the anomalous subsurface earth conditions, particularly when the non-parallelism lines X are interpreted in the light of other available information concerning the portion of the earth in which the earth structure and composition can significantly influence the distribution of the stray earth currents.

The duration of an observation period providing suitable measurements for the production of such a map as the map W of Fig. 13, may well vary from fifteen minutes or so, up to several hours or even days. In ordinary exploration operations, the observation results shown by the map W of Fig. 12 may well be supplemented by measurements of potential differences at distributed points in one or more exploration fields adjacent to or partially overlapping the exploration field shown by the map W. Thus, in Fig. 13, WA represents a map of an exploration field which includes distributed points $S^9$, $S^{10}$, $S^{11}$, $S^{12}$, $S^{13}$ and $S^{14}$, external to the field shown by the map W, and which also includes the observation points S', S² and S³ within the exploration field shown by the map W.

The equipotential lines XA plotted on the map WA are not parallel to the lines X plotted on the map W. This is the usual condition when two sets of equipotential lines are traced from separate sets of measurements made during non-simultaneous observation periods. The general difference in direction between the lines X and XA are typical of the results to be expected, for example, when the measurements respectively utilized in plotting the two maps are made on successive days. The divergence in direction between the equipotential lines X and XA do not ordinarily indicate or suggest changes in the structure or composition of the portion of the earth traversed by the earth currents giving rise to the measured potential differences, but result from changes in the direction of the stray earth currents traversing the equipotential surfaces represented by said lines. Those earth current changes may be due, as previously indicated, to sun spots or to other and more obscure causes.

When two overlapping exploration fields include common and suitably located points such as the points S', S² and S⁹ of Fig. 13, it is within the knowledge of those skilled in the art to combine and make conjoint use of the two sets of measurements giving rise to the two sets of equipotential lines X and XA. Thus, for example, the information collectively supplied by the measurements from which the equipotential lines X and XA are plotted make it possible to plot on the map W dotted lines XB which will closely approximate the equipotential lines existing in the field shown by the map when the direction of the earth currents in that field are consistent with the direction of the earth currents existing at the time of making the measurements from which the equipotential lines XA were directly plotted. Conversely, it is possible to plot on the map WA equipotential lines consistent with the general direction of the earth currents existing at the time of making the potential measurements from which the equipotential lines X were directly plotted.

To thus coordinate two sets of measurements made at times when the stray earth currents definitely differ in their general direction require a suitable number and disposition of the observation points common to the two sets of measurements. Thus when the measurement points are all earth surface points and are distributed as the points S', —$S^{14}$—$S^{15}$ are assumed to be, there should be at least three points common to the respective fields in which the two sets of measurements are made. Preferably, one of those points should be located on a line perpendicular to and intersecting the line connecting the other two points.

When the observation points include points distributed over the earth's surface and one or more points in a bore hole or mine shaft at a substantial distance below the earth's surface, the common points at which some of the measurements of each set where made should include at least three surface points disposed relative to one another as just described, and should include at least one point below the surface of the earth. When all of the measurements of each set are along a single continuous line, two sets of measurements made at different times can be coordinated, provided each set of measurements include measurements at any two common points along said line.

As previously indicated, in the use of the present invention, the measurements made should be interpreted as far as possible in the light of all other available information or data obtainable with respect to the subsurface structure and composition of the portion of the earth sufficiently close to the measurement points to affect the measurements made. The information which if available should be considered in interpreting the measurements obtained by the practice of the present invention, include geological data, the results of seismographic measurements, and information obtained through boring and subsurface mining operations and old bore holes.

Instead of measuring a plurality of earth potential differences simultaneously in the general manner indicated in Fig. 12, it is possible, and may be advantageous in some cases to rapidly measure the different potential differences successively in a continuous series of measurements. For example, the pairs of terminals which in Fig. 12 are connected to the different amplifying and measuring devices NB may be successively connected to a single amplifying system including a vibrator to which the two terminals of each pair are connected in regular order as the terminals 1 and 2 are connected to the vibrator shown in Fig. 8, with the rapidity required to amplify each of the eight individual potential differences more than a hundred times a minute. The rapidly succeeding potential difference measurements thus made may be exhibited and recorded oscillographically, or the output circuit of the amplifier may be connected successively to individual measuring, indicating and/or recording mechanisms for the different potential differences measured.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some certain cases certain features of my invention may be used to advantage without a corresponding use of other features.

Having now described my invention, what I claim as new and desire to secure by Letters Patent, is:

1. The method of electrical prospecting which consists in determining physical characteristics of a subsurface portion of the earth by measuring and integrating the potential difference between a base potential and the potential of a point in said earth portion during an observation period in which appreciable changes in stray earth currents may occur.

2. A method as specified in claim 1, in which the duration of each measuring period is not less than about five minutes.

3. The method of electrical prospecting which consists in determining physical characteristics of a subsurface portion of the earth by measuring and integrating the respective differences between the potentials of each of a plurality of displaced points in said portion and a base potential during an observation period of not less than about five minutes.

4. The method of determining earth potential characteristics of an exploration field portion of the earth by substantially simultaneously measuring the respective differences between a base potential and the potential of each of a plurality of displaced points in said field.

5. The method of electrical prospecting which consists in impressing a potential difference on first and second spaced apart earth points in such manner as to maintain the potential of the first point higher than the potential of the second point during measuring periods alternating with measuring periods in which the potential of the second point is higher than the potential of the first point, measuring and integrating the difference between a base potential and the potential of a third earth point so located that its potential is affected by the potentials at the first and second earth points, and reversing the relative polarities of said measured and integrated potential differences for the said alternating measuring period substantially simultaneously with the reversals of the polarities of the impressed potentials.

6. The method of electrical prospecting which consists in determining characteristics of a subsurface portion of the earth by successively measuring the respective difference between a base potential and the potentials of each of a plurality of fixed points in said portions in rapidly repeated series of measurements, and separately integrating the measurements of each of said differences.

7. The method of electrical prospecting which consists in determining physical characteristics of a subsurface portion of the earth, by substantially continuously measuring and integrating the difference between a base potential and a pivotal point in said earth portion during an observation period of not less than about five minutes.

8. In the investigation of the stray earth current flow in a subsurface portion of the earth, not subject to controlled artificial energization, the method which consists in simultaneously measuring the respective potential differences between each of a plurality of distributed points in said earth portion and a common base potential, and integrating the potential differences measured during an observation period sufficiently prolonged to make the component of each integrated potential difference due to diurnal earth current variations much larger than the component due to more rapid, earth current variations of similar magnitude.

9. Electrical prospecting apparatus comprising in combination an energizing conductor adapted for contact with the earth at one energizing point in an exploration field, a second energizing conductor adapted for contact with the earth at a second energizing point in the exploration field, a third conductor adapted for contact with the earth at a third point in the exploration field at which the potential is affected by changes in the potentials at said energizing points, a source of energizing current having positive and negative terminals, a fourth conductor adapted for connection to a base potential source, a voltage integrating device having two terminals, means for interchangeably connecting said source terminals to said energizing conductors to thereby alternately raise and lower the potential of one of said energizing points relative to the other, and means for interchangeably connecting the terminals of said device to said third and fourth conductors in timed relation to the changes in the connections between said source terminals and energizing conductors so as to prevent those changes from reversing the potential difference between said device terminals.

10. Apparatus as specified in claim 9 including means for substantially continuously recording the value of the potential integration by said integrating device.

11. Electrical prospecting apparatus comprising in combination a first energizing conductor adapted for connection to the earth at one energizing point, a second energizing conductor adapted for connection to the earth at a second energizing point, a source of unidirectional current having two discharge terminals differing in potential and normally connected to said energizing conductors to thereby establish an energizing circuit varying the potential difference between said energizing points, reversing means periodically operable to reverse the connections between said energizing conductors and said terminals and thereby modify the earth current flowing between said energizing points, a third conductor adapted for connection to the earth at a point in said field at which the potential is affected by the current flow between said energizing points, a fourth conductor adapted for connection to a source of base potential, integrating mechanism comprising a pair of terminals normally connected, respectively, to said third and fourth conductors to thereby form an observation circuit and comprising means for integrating the potential difference between said terminals, and reversing means operable to reverse the connections between the terminals of said integrator and said third and fourth conductors in timed relation with the reversal of the connections between said energizing conductors and current source terminals to prevent the last mentioned reversals from significantly modifying the potential difference between the terminals of said integrating device.

12. Apparatus as specified in claim 11, in which the two reversing means are relatively arranged to keep said observation circuit open during each period in which the first mentioned reversing means is effecting each modification of the earth current flowing between said energizing points.

13. Apparatus as specified in claim 11, in which the first mentioned reversing means keeps the energizing circuit open for a short period during each of its several actions and in which the second mentioned reversing means keeps the observation circuit open during each of said periods and during a short period following each of the first mentioned periods.

14. In the investigation of the stray earth current flow in a subsurface portion of the earth, the method which consists in simultaneously integrating the respective differences between the potentials of each of a plurality of distributed points in said earth portion and the average of said potentials.

15. Apparatus for investigating the stray earth current flow in a subsurface portion of the earth comprising in combination means for simultaneously measuring and integrating the values of the respective differences between the potentials at each of a plurality of displaced points in said earth portion and a common base potential and means for periodically recording the then existing measured and integrated values of said potential differences.

CHARLES R. NICHOLS.

REFERENCES CITED

The following references are of record in the file of this patent:

UNITED STATES PATENTS

| Number | Name | Date |
|---|---|---|
| 1,813,845 | Gish | July 7, 1931 |
| 1,956,413 | Clayton | Apr. 24, 1934 |
| 2,046,436 | Wascheck | July 7, 1936 |
| 2,263,097 | Marchand | Nov. 18, 1941 |
| 2,274,903 | Krasnow | Mar. 3, 1942 |
| 2,342,627 | Evjen | Feb. 29, 1944 |
| 2,342,629 | Evjen | Feb. 29, 1944 |
| 2,343,140 | Evjen | Feb. 29, 1944 |
| 2,345,608 | Lee | Apr. 4, 1944 |

FOREIGN PATENTS

| Number | Country | Date |
|---|---|---|
| 364,728 | Great Britain | Jan. 14, 1932 |